United States Patent
Harrison

[15] 3,693,776
[45] Sept. 26, 1972

[54] PUSHER LOADING MEANS FOR CONVEYORS
[72] Inventor: John Harrison, Lincolnwood, Ill.
[73] Assignee: The Spra-Con Company, Chicago, Ill.
[22] Filed: Sept. 30, 1971
[21] Appl. No.: 185,311

[52] U.S. Cl. ..................... 198/23, 198/174
[51] Int. Cl. ............... B65g 19/10, B65g 47/04
[58] Field of Search ........... 198/20, 23, 38, 174, 102; 214/11 R; 53/48

[56] References Cited

UNITED STATES PATENTS

| | | | |
|---|---|---|---|
| 2,937,739 | 5/1960 | Levy | 198/38 |
| 3,166,181 | 1/1965 | Rutkus | 198/102 |
| 3,333,677 | 8/1967 | Harrison | 198/129 |
| 3,339,699 | 9/1967 | Harrison | 198/23 |
| 3,361,247 | 1/1968 | Lauzon | 198/38 |
| 3,542,215 | 11/1970 | Fromme | 214/11 |

Primary Examiner—Edward A. Sroka
Attorney—McDougall, Hersh & Scott

[57] ABSTRACT

A system for loading articles on a conveyor which includes a plurality of article carrying areas and having a loading platform positioned alongside the path of conveyor movement. The system includes pusher means which are mounted on a separate conveyor and which engage articles positioned on the platform. The pusher means are guided by track means so that the articles move longitudinally in the direction of conveyor movement and transversely toward the conveyor so that the articles can be deposited on the conveyor in an extremely smooth but rapid fashion. The pusher means include automatically operated and pivotally mounted end paddles which corner articles engaged by the pusher means to insure transfer movement over the platform and toward the conveyor.

10 Claims, 11 Drawing Figures

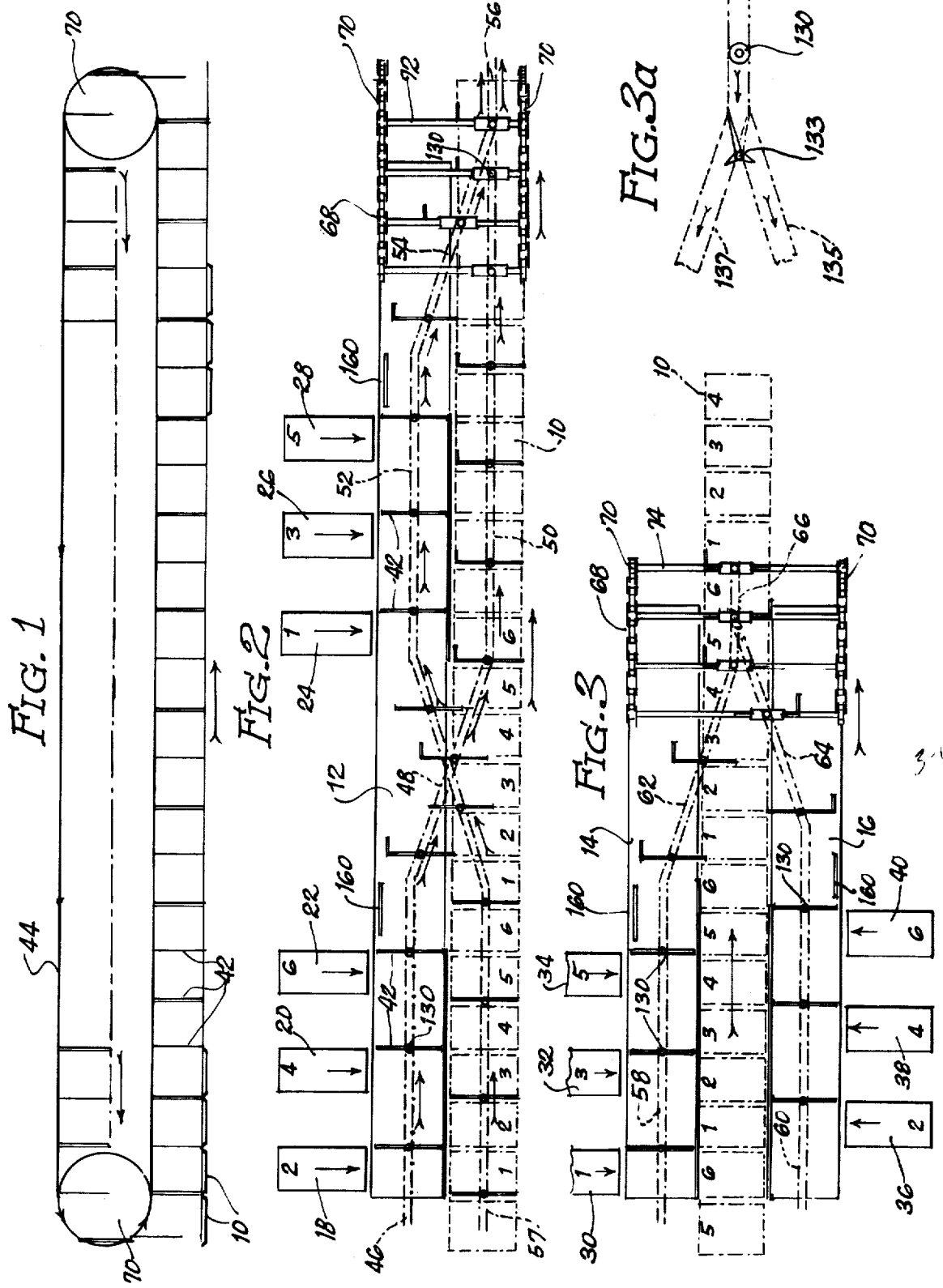

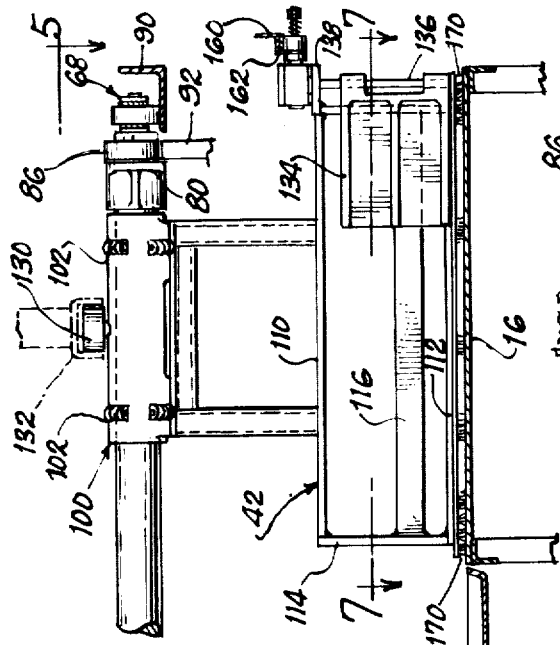

PATENTED SEP 26 1972 3,693,776

PUSHER LOADING MEANS FOR CONVEYORS

This invention relates to a conveyor system and particularly to means for efficiently loading articles on the conveyor.

The use of conveyors which include automatic means for loading and unloading the conveyors is rapidly increasing. Furthermore, the requirement for high speed operation is more and more common and, accordingly, automatic systems which permit high speed operation must be developed. One of the basic problems involved in such developments is the handling of the articles in a fashion such that the articles will not be damaged. Thus, articles cannot be moved onto a conveyor in a manner such that there will be any severe impact or tumbling of the articles. This is particularly true where fragile articles are being continuously handled or in applications such as post office operations where fragile articles are included in at least a significant part of the packages handled.

Attempts have been made to provide for manual loading of articles on conveyors; however, this technique is unsatisfactory since it severely limits the speed of conveyor movement. The limitations of manual loading are even more pronounced where automatic discharge of the articles is required. In such systems, endless conveyors move adjacent a plurality of discharge stations located along the conveyor path. Articles are placed on the conveyor at one of these stations, and coding means are actuated at the same time. The articles will then be automatically discharged at a particular discharge location. It is naturally very difficult for even a relatively skilled person to apply a code and load an article on a particular conveyor area when the conveyor is moving at very high speed.

Some mechanical systems have been proposed for loading articles onto moving conveyors such as described, for example, in Harrison et al. U.S. Pat. Nos. 3,333,677 and 3,339,649. These systems provide a table located above the path of movement with pusher means being provided for sweeping articles off the table and onto moving conveyors. Another arrangement is described in Harrison application Ser. No. 45,174, filed on June 9, 1970 and entitled "Conveyor Loading System".

The Harrison application also describes a loading arrangement which provides for the introduction of articles in a very efficient fashion from the standpoint of achieving a high speed operation. Specifically, pusher means for the articles are located at relatively widely spaced intervals so that articles can be introduced between the pusher means with relative ease even when the pusher means are moving very rapidly. By using separate sets of pusher means operating in timed sequence with conveyor carrying areas, all of the carrying areas on a conveyor can be efficiently loaded even though high speed induction means are not used.

It is a general object of this invention to provide an improved article loading system for high speed conveyors, particularly for conveyor arrangements of the type described in the aforementioned Harrison application.

It is a more specific object of this invention to provide a loading system for conveyor constructions which permits high speed operation of a conveyor while at the same time avoiding any impact, tumbling, or other abuse to articles being loaded.

These and other objects of this invention will appear hereinafter and for purposes of illustration, but not of limitation, specific embodiments of the invention are shown in the accompanying drawings in which:

FIG. 1 is a schematic side elevation of a conveyor loading system characterized by the features of this invention;

FIG. 2 is a plan view of the loading system shown in FIG. 1;

FIG. 3 is a plan view of an alternative loading system also characterized by the features of this invention;

FIG. 3a is a schematic illustration of a toggle switch means employed for controlling the positions of the successive pusher means in the construction;

FIG. 4 is a cross-sectional view illustrating the pusher means utilized for loading articles onto a moving conveyor and also illustrating the supporting and separate conveyor means for the pusher means;

FIG. 5 is a top plan view of the construction shown in FIG. 4;

FIG. 6 is a horizontal, fragmentary sectional view taken about the line b—6 of FIG. 4;

FIG. 7 is a horizontal fragmentary sectional view taken about the line 7—7 of FIG. 4;

Figure 8:
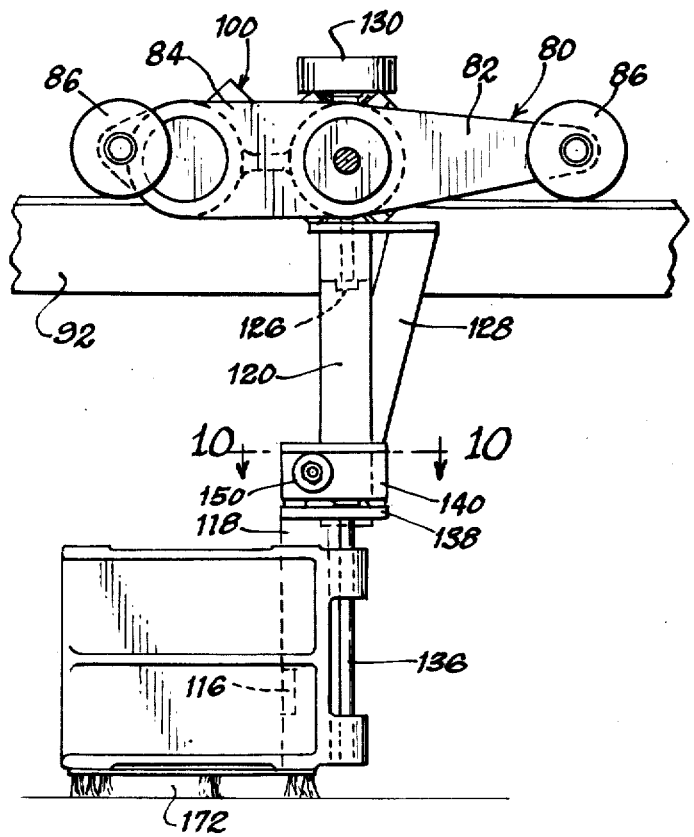
FIG. 8 is an enlarged vertical sectional view taken about the line 8—8 of FIG. 4.
Figure 9:
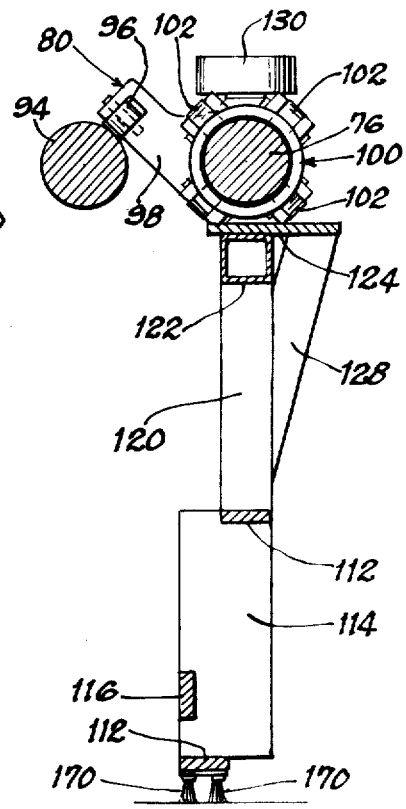
FIG. 9 is an enlarged vertical cross sectional view taken about the line 9—9 of FIG. 4; and, FIG. 10 is an enlarged horizontal sectional view taken about the line 10—10 of FIG. 8.

This invention generally relates to a loading system for use in conjunction with a conveyor. The system is employed with conveyors having a plurality of article carrying areas with a loading platform being positioned alongside the path of conveyor movement. The invention provides for the movement of the articles over the surface of the loading platform and then onto an article carrying area.

The movement of the articles is accomplished by means of pusher means which are supported on a separate conveyor. The pusher means sweep over the platform surface and tracks guide the pusher means angularly toward the conveyor after the pusher means have engaged an article. The pusher means include an end paddle which closes after engagement of an article so that the article is cornered by the pusher means to maintain the article in engagement with the pusher means until the article has been deposited on a conveyor. The speeds of the pusher means and conveyor are synchronized so that the entire loading operation is carried out in a very gentle fashion with no abuse being applied to any articles even though the conveyor may be operating at very high speed.

The construction illustrated in FIGS. 1, 2 and 3 includes a plurality of trays 10 which are associated with a conveyor. These trays are each adapted to receive an article and to move the articles past discharge locations along the path of conveyor movement. The loading system of this invention are particularly useful in connection with conveyor operations as described in the aforementioned Harrison application, and in connection with other conveyor operations, for example as described in Speaker U.S. Pat. No. 3,034,665; Harrison U.S. Pat. No. 3,589,501 and Gary U.S. Pat. No. 3,563,395. Reference is made to these disclosures for purposes of providing a suitable background for the following description.

The conveyor trays follow a path of movement which moves them alongside loading platforms. In FIG. 2, a loading platform 12 is positioned on one side of the conveyor trays. In FIG. 3, platforms 14 and 16 are located on opposite sides of the conveyor trays 10. It will be appreciated when considering the following description that the loading means can be employed in conjunction with a variety of such arrangements.

A plurality of induction belts 18–28 and 30–40 are, respectively, positioned alongside the conveyors in FIGS. 2 and 3. As described in the aforementioned Harrison application, the conveyor trays are numbered consecutively in groups of six, and the induction belts are each designated for trays of a particular number. Thus, all articles delivered to the platforms from induction belts 4 will eventually be deposited on trays 4.

The movement of the articles is accomplished by means of pushers 42 which are mounted for movement in the direction of the conveyor movement. The pushers 42 are supported on a separate conveyor which is driven along with the tray conveyors whereby a given pusher will always maintain the same relationship with respect to the trays. As shown in FIG. 2, each pusher is located so that it is directly in line with the trailing edge of a tray.

In accordance with the teachings in the aforementioned Harrison application, the pushers, when opposite the induction means, are spaced at intervals equal to the spacing between the trailing edges of every other tray. This provides a relatively large space between pushers which simplifies movement of articles from the induction means onto the adjacent platforms. The induction means preferably comprise driven belts which are automatically actuated in the manner described in the aforementioned application so that the articles can be transferred onto the platforms without any abuse to the articles. It will be appreciated, however, that manual introduction of the articles onto the platforms is possible because of the gap which is maintained between the pusher means.

The pushers 42 are engaged by tracks in the course of their movement along the lower flight of their supporting conveyor 44. In the embodiments of the invention shown in FIGS. 2 and 3, two track sections are employed with each track carrying pushers to be utilized in conjunction with one set of induction belts. Specifically, the tracks illustrated in FIG. 2 include one track having a first portion 46 which extends over the platform 12 opposite the induction belts 18, 20 and 22. Accordingly, the pushers running on this track portion will engage articles introduced to the platform from these induction belts. A second portion 48 of this track extends angularly inwardly whereby the pushers carried by the track are directed toward the conveyor trays. A third portion 50 of this track communicates with the second portion 48 whereby the pushers will assume a path of movement over the conveyor trays.

The second track shown in FIG. 2 includes a first portion 52 which extends over the platform 12 opposite the induction belts 24, 26 and 28. A second portion 54 of the track directs the pushers on the track to a position over the conveyor trays, and a third portion 56 of the track carries the pushers for a short distance in a position directly over the conveyor trays. The track portion 57 is maintained apart from the portion 46 of the first track to avoid interference of the pushers on the second track with the loading operation from induction belts 18, 20 and 22.

The separate tracks shown in FIG. 3 include first portions 58 and 60 which extend, respectively, over the platforms 14 and 16, second portions 62 and 64 for directing the pushers toward the conveyor and third portions 66 for carrying the pushers over the conveyor.

The pushers are carried over the conveyor 44 by means of chains 68 which extend over sprockets 70. The pushers are mounted on transverse rod assemblies 72 in the conveyor shown in FIGS. 1 and 2 while rod assemblies 74 are utilized for the conveyor shown in FIG. 3.

FIGS. 4 through 10 illustrate the details of the rod supporting structures and pushers. The figures relate to a structure of the type shown in FIG. 3 although the same principles will apply to the structure of FIGS. 1 and 2 as well as other variations.

The rod assembly 74 comprises a first rod 76 which is attached by means of swivel connections to linking bars 78 of the conveyor chains 68. A stabilizing bracket 8 is positioned at each end of each rod 76, and this bracket includes oppositely extending arm portions 82 and 84 with each arm portion carrying a guide roller 86. The chain drive 68 includes rollers 88 at each linking position. These rollers ride on tracks 90 with the tracks 90 extending between the sprockets 70. The stabilizing rollers 86 ride on a bar track structure 92 which extends along the lower flight of the conveyor.

The arms 84 of the stabilizing brackets define openings for receiving stabilizing rods 94. These rods are positioned in parallel relationship with respect to the pusher supporting rods 76, and a roller 96 associated with each pusher is adapted to ride on the stabilizing rod 94. Each roller 96 is carried on an arm 98 which forms a part of the pusher supporting bracket 100. This bracket carries eight additional bearing rollers 102 which engage the pusher supporting rod 76. With this arrangement, the bracket 100 is slideably mounted on the rod 76 for movement transversely between the ends of the rod. The stabilizing rod 94 serves to maintain the pusher in the upright position illustrated. Because of the swivel connection between the ends of the rods 76 and conveyor chain, the rods will hang downwardly throughout their movement along the conveyor.

The pushers 42 each comprise an elongated transversely extending portion formed by means of upper and lower frame members 110 and 112, and vertically extending end frame members 114. A cross bar 116 extends between the end frame member 114 and an inner frame member 118. A facing in the form of a sheet of plexiglass or other solids member preferably covers the frame so that irregularly shaped packages, packages with strings, and other objects can be effectively engaged.

A pair of vertically extending tubular members 120 are connected between the horizontal frame member 110 and the pusher supporting bracket 100. The tubular members 120 are attached together by means of a transverse tubular member 122 which is welded to a plate 124. The assembly of the tubular members and plates are secured to the bracket 100 by means of bolts 126. Additional braces 128 may be attached between the plate and the frame member 110.

Each of the pushers carries a guide roller 130 which is engaged by the track portions previously described. As shown in FIG. 4, these track portions comprise inverted U-shaped sections 132 which confine the guide rollers 130. As the conveyor moves the guide rollers relative to the track sections, the brackets 100 supporting the pushers will slide back and forth over the rod assemblies, depending upon the direction of the tracks.

As shown in FIGS. 1–3, the pushers are all confined by the same track beyond the tray loading locations, while the pushers must be split before returning for the next loading operation. The splitting may be accomplished by means of a conventional toggle switching arrangement as shown in FIG. 3a. The toggle member 133 may have an overcenter spring whereby the member will alternate between the position shown to guide a roller 130 into track portion 135, and the opposite position to guide the succeeding roller into track portion 137. The toggle may be located on either the lower or upper level with the latter being preferred to minimize the space requirements.

Figure 10:
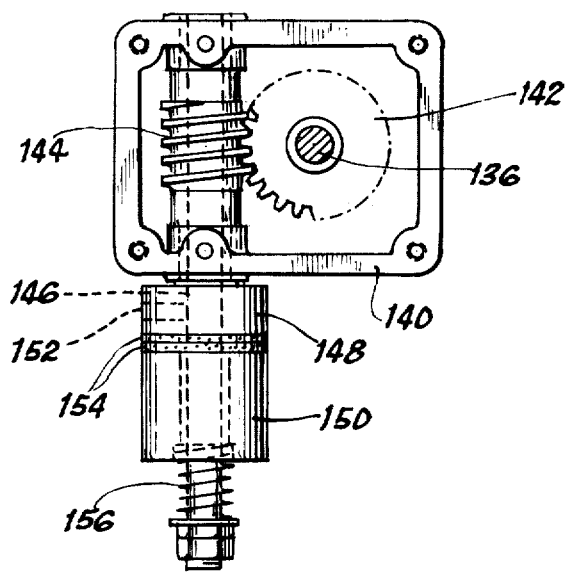

Each of the pushers includes an end paddle 134 which is tied to a vertically extending rod 136. This rod is received by a horizontal plate 138 which is attached to the pusher frame. As best shown in FIG. 10, the rod 136 extends into a housing 140 mounted on top of the plate 138. A gear 142 is tied to the rod 136, and the teeth of this gear engage horizontally extending worm gear 144. The shaft 146 to which the worm gear is secured extends outwardly of the housing 140. A clutch drive mechanism comprising a first sleeve 148 and a driving sleeve 150 is located on this shaft extension. The sleeve 148 is tied to the shaft extension by means of set screw 152. Friction discs 154 are interposed between the sleeves 148 and 150, and a spring 156 presses the sleeve 150 against the friction discs.

When the sleeve 150 is engaged by a drive means, the worm gear will rotate the gear 142. In the embodiment of the invention illustrated, the drive means for the sleeve 150 comprises a track member 160 having a nylon face 162 (FIG. 4). The bearing engagement of the sleeve 150 against the track serves to drive the gear 142 through 270° thereby swinging the associated end paddle 134 from a position flush with the main portion of the pusher 42 to a position perpendicular to the main portion. As illustrated schematically in FIGS. 2 and 3, the tracks 160 are positioned immediately beyond each group of delivery belts whereby the end paddles will close before the pushers begin angular movement over the platforms. In this closed position, the pushers will retain the articles until they are deposited on the desired conveyor tray.

A stop 163 is positioned on frame members 118 to limit movement of the end paddles to the closed positions shown. Because of the mechanical nature of the worm gear and gear 142, the end paddles are self-locked in position. Accordingly, separate drive means are required for returning the end paddles to the flush position after they have performed the function of moving articles onto conveyor trays. This can be accomplished by providing a corresponding drive track for engagement of the sleeve 150 as the paddles move along the upper flight of the carousel conveyor. The worm gear will, of course, have to be rotated in the opposite direction in order to achieve this movement, and this can be accomplished by simply placing the drive track on the opposite side of the sleeve.

In many cases, particularly in post office operations, packages or other articles of varying sizes and having different characteristics must be handled. To insure that all types of articles can be handled, the pusher structures illustrated are preferably provided with brushes 170 extending along the underside of the frame member 112, and brushes 172 extending along the underside of the end paddles 134. These brushes are particularly effective for purposes of engaging strings, then package portions or other unusual shapes which might otherwise complicate the delivery of articles to the conveyor trays. Strings, for example, can catch in various moving parts of the apparatus and create a significant problem.

The apparatus described provides for the highly efficient movement of articles onto a moving conveyor. The articles are positively engaged by the pushers, and there is an absolute minimum of motion of an article relative to its pusher and relative to the tray or other conveyor area upon which it is deposited. There is no tumbling or impact of an article which could lead to damage of the article or, in the case of a package, to contents. The system is also totally adaptable to automatic operation as described in the aforementioned Harrison application. The structures described are of a relatively basic mechanical nature, and a highly compact and efficient arrangement can be constructed. Since the pusher conveyor is intended for movement at the same speed as the article conveyor, the drive mechanism for the separate conveyors can be tied together thereby eliminating the need for any complex synchronizing controls. The system does not require any complicated induction belts insofar as the transfer onto the conveyor is concerned since only stationary platforms positioned alongside the conveyor are provided. The provision of the movable end paddles on the pushers which provides the basic advantages of the invention has been accomplished with relatively simply mechanical arrangements, particularly since the drive means for the worm gears may comprise simply short stationary tracks which will achieve automatic opening and closing of the end paddles.

It will be understood that various changes and modifications may be made in the above described constructions which provide the characteristics of this invention without departing from the spirit thereof particularly as defined in the following claims.

That which is claimed is:

1. In a system for loading articles on a conveyor wherein the conveyor defines a plurality of article carrying areas, a loading platform positioned alongside the path of conveyor movement, means for loading articles on said platform, pusher means mounted on a separate carrier for movement with said conveyor and adapted to engage articles positioned on the platform, and drive means for the pusher means, the improvement comprising means for controlling the pusher means whereby the pusher means operate to deposit articles on the conveyor, said means for controlling the pusher means comprising guide means engaging the pusher means and thereby determining the position of the pusher means, said guide means operating to direct said pusher means in the direction of conveyor movement whereby articles engaged by the pusher means are moved by the pusher means longitudinally over said platform, and said guide means operating to simultaneously direct each pusher means angularly in a direction toward said conveyor when an article carrying area is in position for receiving an article whereby each pusher means will move articles transversely over the platform and onto article carrying areas of said conveyor, and wherein each of said pusher means comprises a transversely extending portion defining an article engaging face, a paddle attached to said transversely extending portion at the end of the pusher means remote from said conveyor, and means for moving said paddles for locating the paddles in an open position during loading of articles on said platform, and for thereafter moving said paddles to turn the paddles to a closed position whereby the paddles form a corner configuration with said transversely extending portions to thereby maintain the articles in engagement with the pusher means during movement of the pusher means toward the article conveyor.

2. A construction in accordance with claim 1 wherein said guide means comprise track means, first portions of said track means extending over said platform and alongside said conveyor for guiding the pusher means over the platform, second portions of the track means extending angularly inwardly to a position over said conveyor for guiding said pusher means away from the platform and to the conveyor, and third portions of said track means extending over said conveyor for guiding said pusher means along the conveyor.

3. A construction in accordance with claim 2 wherein the means supporting the pusher means on said separate carrier comprise transversely extending rods, means slideably supporting said pusher means on said rods, said track means operating to drive said pusher means back and forth along the length of the rods for movement of the pusher means between positions over said platform and over said article conveyor.

4. A construction in accordance with claim 1 including brushes extending along the bottom edge of said pusher means, said brushes sweeping said platform during movement of the pusher means.

5. A construction in accordance with claim 1 wherein said paddles are pivotally attached to said pusher means, paddle drive means carried by the pusher means, said means for moving the paddles operating said paddle drive means, and wherein said guide means comprise track means, first portions of said track means extending over said platform and alongside said conveyor for guiding the pusher means over the platform, second portions of the track means extending angularly inwardly to a position over said conveyor for guiding said pusher means away from the platform and to the conveyor, and third portions of said track means extending over said conveyor for guiding said pusher means along the conveyor, said first portion of said track means being located opposite said induction stations.

6. A construction in accordance with claim 5 wherein said induction stations are located at spaced apart intervals along said platform, said intervals being equal to at least twice the width of said article carrying areas, and said pusher means being spaced apart by corresponding intervals.

7. A construction in accordance with claim 6 wherein the article carrying areas on said article conveyor are divided into sets of alternating areas, and including first and second groups of induction means, one of said groups operating to deliver articles for engagement by pusher means delivering articles to one set of article carrying areas, and the other of said groups operating to deliver articles for engagement by pusher means delivering articles to the other set of article carrying areas.

8. A construction in accordance with claim 7 wherein said separate carrier operates in synchronism with said article conveyor, each of the pusher means on said separate carrier thereby moving in timed relationship with specific article carrying areas, said pusher means being located on said separate carrier whereby the pusher means move adjacent the trailing edge of each article carrying area.

9. A construction in accordance with claim 8 including separate track means for guiding alternating pusher means, one track means guiding the pusher means delivering articles to one set of article carrying areas, and the other track means guiding pusher means delivering articles to the other set of article carrying areas.

10. A construction in accordance with claim 5 wherein said paddle drive means comprise a rotating shaft connected to said paddles, said paddle drive means comprising means positioned alongside the platform for engaging the rotating shafts of each paddle as the associated pusher means move over the platform.

* * * * *